Sept. 27, 1949.　　　　C. E. TACK　　　　2,483,375
SPRING GROUP

Filed June 29, 1944　　　　　　　　2 Sheets-Sheet 1

INVENTOR.
Carl E. Tack
BY
Orrin O. B. Garner Atty.

Sept. 27, 1949.  C. E. TACK  2,483,375
SPRING GROUP
Filed June 29, 1944  2 Sheets-Sheet 2
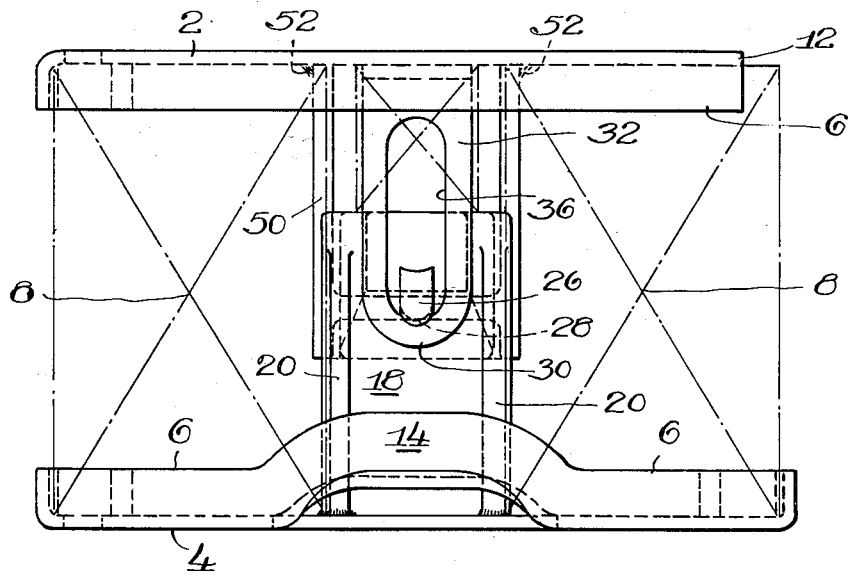
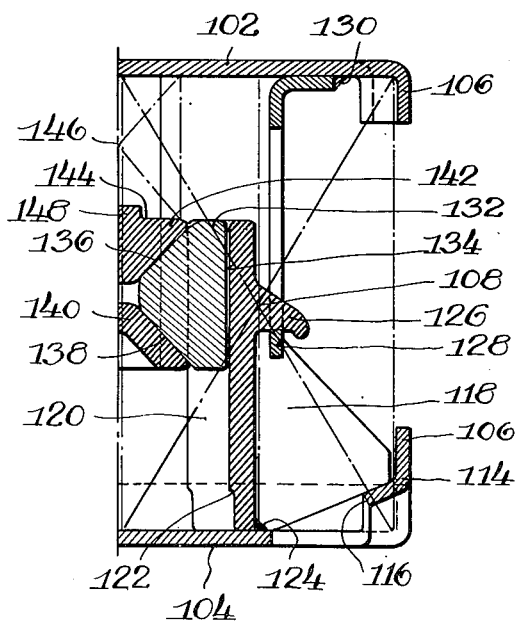
INVENTOR.
Carl E. Tack
BY
Atty.

Patented Sept. 27, 1949

2,483,375

UNITED STATES PATENT OFFICE 2,483,375

SPRING GROUP

Carl E. Tack, Chicago, Ill., assignor to American Steel Foundries, Chicago, Ill., a corporation of New Jersey Application June 29, 1944, Serial No. 542,793

20 Claims. (Cl. 267—9)

My invention relates to a spring group of well known composite type including a plurality of coil springs together with snubbing means in the form of a friction device associated with said springs for control of oscillations thereof.

My novel device is in a form particularly suitable for application to railway freight car trucks and is devised particularly for application to so-called long travel spring trucks wherein a greater length of supporting spring is provided in a freight car truck than has normally been accepted as standard. In such an arrangement it is possible to secure a softer ride, so-called, in that the springs may oscillate over a longer distance and therefore give an easier ride than is possible with a spring group having a shorter travel.

My novel arrangement is devised particularly to develop in such a long travel spring arrangement the amount of friction required throughout the stroke of the spring group to effectively dampen oscillations and prevent their synchronous development in such manner as might otherwise occur with resultant damage to lading, rolling stock and right of way.

My invention contemplates such an arrangement as that described, wherein a fairly constant frictional absorption will be afforded at any portion of the stroke and in either direction thereof. In other words, it is an object of my invention to devise a frictional absorption arrangement in which the resilient means, operative to urge the shoes into engagement with the friction surfaces, will be under substantially constant pressure at all times and at all positions of the stroke.

More specifically, my novel device comprises a spring group having top and bottom plates, coil springs confined therebetween and a friction device intermediate said coils, said friction device including friction panels secured to one of said plates, and means fixed to the other of said plates for support of friction shoes in engagement with said panels. In one modification I have associated a wedge block with the friction shoes and an auxiliary spring bearing against the wedge block for actuation of the shoes, while in another modification the auxiliary spring bears directly upon the shoes. In both modifications I have illustrated means for limiting the expansion of the spring group, said limiting means serving to retain the device in assembled relationship.

In the drawings,

Figure 3 is a side elevation taken from the right as seen in Figures 1 and 2.

Figure 4 illustrates a second modification, the view of Figure 4 being comparable to that of the sectional view shown at the right of Figure 2.

Figure 1:
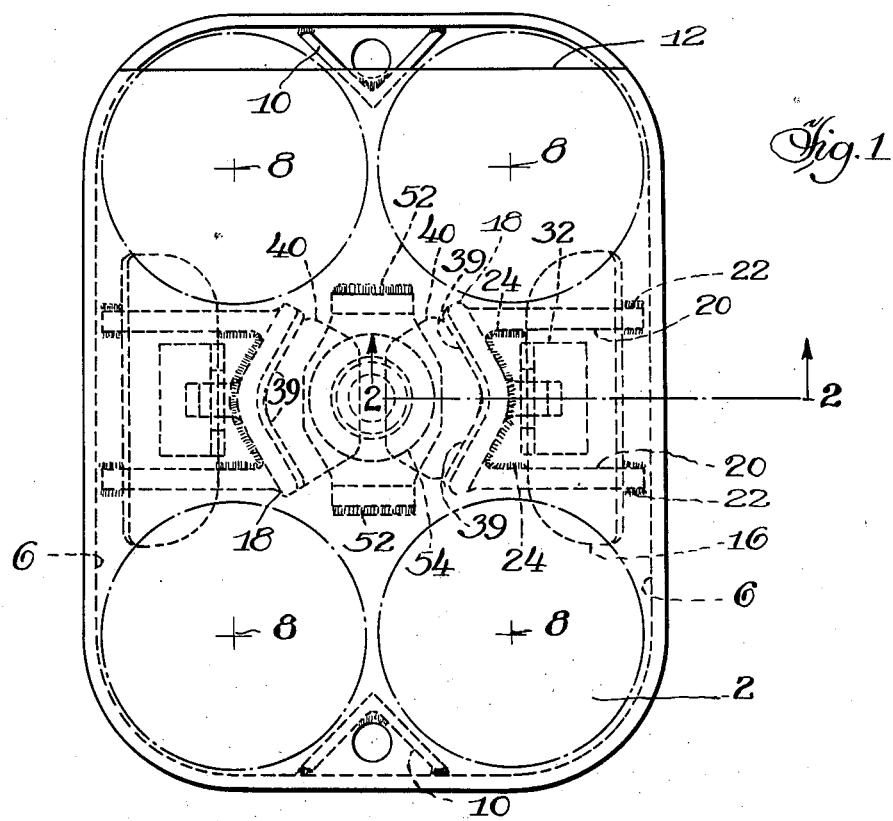
Figure 1 is a top plan view of my novel form of spring group.

My novel arrangement comprises a top spring plate 2 and a bottom spring plate 4, each of said plates being provided with an inturned flange 6 extending about the perimeter thereof and serving in part as positioning means for long travel coil springs confined therebetween and diagrammatically indicated at 8, 8, additional positioning means for said coils being provided at the opposite ends of each plate, as indicated at 10, 10 (Figure 1). The top spring plate 2 may be cut away as at 12 (Figure 1) at the inner end thereof in order to afford additional clearance for the tension member of the bolster normally supported thereon. At opposite sides of the bottom plate 4 is formed a corrugated portion 14, and adjacent said corrugation a portion of the plate is cut away to form an elongated opening 16, said opening and corrugation being suitable for accommodation of a truss portion of a well known type of side frame having a corrugated tension member.

Intermediate the coil springs 8, 8 at the respective ends of the device may be positioned my novel friction arrangement comprising spaced V-section friction columns or panels 18, 18, each of said panels having at opposite edges thereof spaced tapering vertical webs 20, 20 which may be welded at the feet thereof as at 22, 22 (Figure 1) adjacent the perimeter of the supporting plate. Additional welding may be afforded between each friction column or panel and said plate along the base of the friction plate at the juncture of the webs 20 with the friction panel, as clearly seen at 24, 24 (Figure 1). Each friction panel 18 may present on its outer face a lug 26 which may be engaged as as 28 by the loop end 30 of the slotted angle bracket, generally designated 32, the upper base portion of which may be welded as at 34 to the top spring plate 2 so that engagement of the lug 26 in the slot 36 of said bracket may afford a means to limit expansion of the device as a whole. The friction columns 18, 18 may present opposed vertical V-shaped friction faces 38, 38 against each of which may seat as at 39, 39 (Figure 1) a wedge friction shoe 40 each of said shoes having a vertical wedge face complementary in form to the face of the adjacent friction panel and having clearance therefrom at the apex of said wedge as at 42, as clearly seen in the top plan view of Figure 1, in order to afford a good seat for said shoe along said V-shaped friction surface. An offset portion or shoulder may be formed as at 41 adjacent the base of each friction column, said shoulder defining the lower edge of the friction face 38 and preventing the wear of shoulders therealong.

Figure 2:
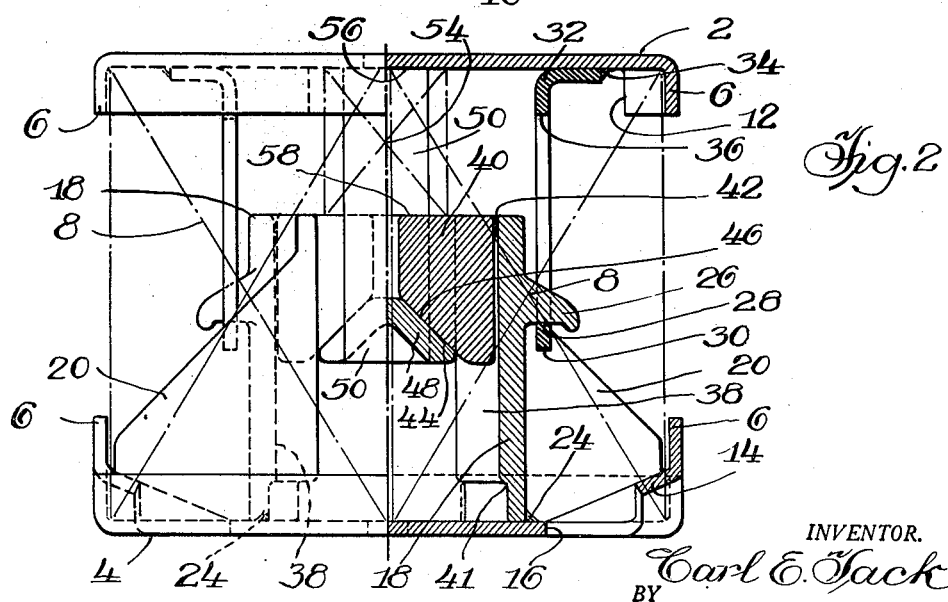
Figure 2 is an end elevation thereof taken from the bottom as seen in Figure 1 and half in section, with the section taken approximately in the vertical plane bisecting the device as indicated by the line 2—2 of Figure 1.

Each shoe 40 may have at the base thereof an angular flat face 44 having slidable engagement as at 46 with the adjacent diagonal web 48 of the shoe positioning stud or yoke, generally designated 50, said yoke having the upper ends of the respective legs thereof welded as at 52, 52 (Figure 1) to the top spring plate 2. Intermediate the legs of said yoke 50 may be positioned the auxiliary spring 54, said spring being seated as at 56 (Figure 2) against the top spring plate and bearing as at 58 against the tops of the respective friction shoes 40, 40, said auxiliary spring 54 serving to urge said shoes into engagement with the respective friction panels and with the diagonal webs 48, 48 of the yoke 50.

The modification illustrated in Figure 4 is substantially identical to that just described except that a wedge element is associated with the friction shoes. In this modification the top spring plate 102 and the bottom spring plate 104 confine therebetween spaced coil springs 108, 108, as described for the previous modification, and each spring plate is afforded an annular spring positioning flange 106, the bottom spring plate 104 also having a corrugated portion 114 and an adjacent opening 116 similar to that described for the previous modification. The friction column or panel 118 with the vertical V-shaped friction face 120, offset as at 122 and welded to the bottom plate as at 124, is unchanged, as may also be the travel limiting lug 126 on the friction panel 118 and the slotted bracket 128 welded as at 130 to the top spring plate 102. In this modification, each friction shoe 132 may have V-shaped vertical friction faces in engagement with the complementary friction face 120 of the friction panel with clearance as at 134, as noted in the previous modification. In the present modification, however, each friction shoe may have upper and lower diverging flat faces having frictional engagement respectively as at 136 and 138 with the yoke 140 and the wedge block 142. The wedge block 142 may present on its top face a seat as at 144 for an auxiliary spring group diagrammatically indicated at 146, positioning means for said group being afforded on said block as at 148. In this modification, the spaced friction shoes 132, 132 are urged into frictional engagement with the yoke 140 and the respective friction columns 118, 118 by the wedge block 142 superposed thereon, and the auxiliary spring 146 bears against the wedge block at all times with substantially equal pressure so that the frictional absorption between the shoes and the columns will remain substantially constant throughout the stroke of the device and in both directions thereof.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a spring group, top and bottom spring plates, coil springs confined therebetween adjacent opposite ends thereof, and a friction device intermediate said coil springs, said device comprising spaced columns fixed to one of said plates and presenting opposed vertical V-shaped friction faces, a yoke fixed to the other of said plates and present diverging diagonal friction surfaces, friction shoes each engaging one of said surfaces and an opposed face, and resilient means compressed between said yoke-supporting plate and said shoes, said yoke, said shoes and said resilient means moving as a unit with said yoke-supporting plate to afford substantially uniform frictional absorption throughout the stroke of said device and in both directions thereof.

2. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs, friction shoes engaging said webs and the adjacent columns respectively, and means urging said shoes into engagement with said webs and columns, said means comprising a wedge and a resilient member compressed between said shoes and said yoke-supporting plate, said wedge engaging said shoes along diverging flat faces and each shoe engaging the adjacent column along a vertical V-shaped surface.

3. In a spring group, top and bottom plates, coil springs, and a friction device intermediate said springs between said plates and comprising spaced friction panels on one of said plates, means comprising a yoke fixed to the other of said plates and presenting diverging friction webs, a wedge presenting diverging friction faces, spaced friction shoes confined between said webs and faces in abutment with respective panels, and resilient means under compression between said wedge and the adjacent plate, said device comprising means fixed to respective plates for limiting the expansion thereof.

4. In a spring group, top and bottom spring plates, coil springs confined therebetween adjacent opposite ends thereof, and a friction device intermediate said coil springs, said device comprising spaced columns fixed to one of said plates and presenting opposed vertical V-shaped friction faces, a yoke fixed to the other of said plates and presenting diverging diagonal friction surfaces, friction shoes each engaging one of said surfaces and an opposed face, and resilient means compressed between said yoke-supporting plate and said shoes, said friction columns presenting on the remote faces thereof positioning lugs, and means fixed on said yoke-supporting plate and overlying said lugs to limit the expansion of said device.

5. In a spring group, top and bottom spring plates, a coil spring confined therebetween adjacent each end thereof, and a friction device intermediate said coil springs including spaced friction panels secured to one of said plates and shoe-carrying means mounted on the other of said plates, said carrying means supporting friction shoes in engagement with said panels, and auxiliary spring means within said carrying means and compressed between and bearing against said shoes and one of said plates, each of said shoes engaging the adjacent panel along spaced vertical flat faces and engaging said shoe-supporting means along a single flat face diagonally arranged with respect to said first-mentioned faces.

6. In a spring group, top and bottom plates, coil springs confined therebetween at opposite ends of said group, and a friction device intermediate said springs including opposed friction columns fixed to one of said plates and a shoe carrier mounted on the other of said plates and supporting friction shoes in engagement with said columns, each of said shoes engaging the adjacent column along a vertical V-shaped surface and engaging said carrier along a diagonal flat surface, resilient means compressed between said shoes and said carrier-supporting plate, and interengaging means on said columns and on said carrier-supporting plate to limit the stroke of said device.

7. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs, friction shoes engaging said webs and the adjacent columns respectively, and means urging said shoes into engagement with said webs and columns, said means comprising a wedge and a resilient member compressed between said shoes and said yoke-supporting plate, said wedge engaging said shoes respectively along diverging flat faces.

8. In a spring group, top and bottom plates, coil springs, and a friction device intermediate said springs between said plates and comprising spaced friction panels on one of said plates, and means on the other of said plates supporting friction shoes in engagement with said panels, said means comprising a yoke fixed to the other of said plates and presenting diverging friction webs, a wedge presenting diverging friction faces, spaced friction shoes confined between said webs and faces in abutment with respective panels, and resilient means under compression between said wedge and the adjacent plate, said yoke being spaced from said panels to accommodate longitudinal and lateral movement between said plates.

9. In a spring group, top and bottom spring plates, coil springs confined therebetween adjament opposite ends thereof, and a friction device intermediate said coil springs, said device comprising spaced columns fixed to one of said plates and presenting opposed vertical V-shaped friction faces, a yoke fixed to the other of said plates and presenting diverging diagonal friction surfaces, friction shoes each engaging one of said surfaces and an opposed face, and resilient means compressed between said yoke-supporting plate and said shoes, said friction columns presenting on the remote faces thereof positioning lugs for engagement with means fixed on said yoke-supporting plate.

10. In a spring group, top and bottom plates, coil springs confined therebetween at opposite ends of said group, and a friction device intermediate said springs including opposed friction columns fixed to one of said plates and a shoe carrier mounted on the other of said plates and supporting friction shoes in engagement with said columns, each of said shoes engaging the adjacent column along a vertical V-shaped surface and engaging said carrier along a diagonal flat surface, and resilient means compressed between said shoes and said carrier-supporting plate.

11. In a spring group, top and bottom plates, coil springs confined between said plates at opposite ends thereof, and a friction device intermediate said coils including spaced friction columns fixed to one of said plates with opposed angularly arranged friction faces, a shoe-supporting yoke member fixed to the other of said plates and presenting diverging friction webs extending transversely of said column friction faces, friction shoes slidably seated against said webs and engaging the adjacent column faces respectively, and means urging said shoes into engagement with said webs and column faces, said means comprising a resilient member under compression seated against said yoke-supporting plate and operatively associated with said shoes.

12. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs, friction shoes engaging said webs and the adjacent columns respectively, and means urging said shoes into engagement with said webs and columns, said means comprising a wedge and a resilient member compressed between said shoes and said yoke-supporting plate.

13. In a spring group, top and bottom spring plates, coil springs confined therebetween adjacent opposite ends thereof, and a friction device intermediate said coil springs, said device comprising spaced columns fixed to one of said plates and presenting opposed vertical V-shaped friction faces, a yoke fixed to the other of said plates and present diverging diagonal friction surfaces, friction shoes each engaging one of said surfaces and an opposed face, and resilent means compressed between the yoke-supporting plate and said shoes.

14. In a spring group, top and bottom plates, coil springs, and a friction device intermediate said springs between said plates and comprising spaced friction panels on one of said plates, and means on the other of said plates extending intermediate said panels and spaced therefrom to accommodate lateral and longitudinal movement between said plates and comprising a yoke fixed to the other of said plates and presenting diverging friction webs, a wedge presenting diverging friction faces, and spaced friction shoes confined between said webs and faces in abutment with respective panels.

15. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs intermediate said columns, friction shoes engaging said webs and the adjacent columns respectively, and means urging said shoes into engagement with said webs and columns.

16. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs intermediate said columns, friction shoes engaging said webs and the adjacent columns respectively, and means urging said shoes into engagement with said webs and columns, said means comprising a resilient member seated against said top plate.

17. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs intermediate said columns, friction shoes engaging said webs and the adjacent columns respectively, and means urging said shoes into engagement with said webs and columns, said means comprising a resilient member seated against said top plate and bearing against both of said shoes.

18. In a spring group, top and bottom plates, coil springs confined between said plates at opposite ends thereof, and a friction device intermediate said coils including opposed friction columns fixed to one of said plates, a shoe-supporting yoke member fixed to the other of said plates and presenting diverging friction webs intermediate said columns, friction shoes engaging said webs and the adjacent columns respectively, and means urging said shoes into engagement with said webs and columns, said means comprising a resilient member seated against said top plate and reacting against said shoes.

19. In a friction device, spaced plates, spaced opposed friction panels on one of said plates, a shoe-supporting member on the other of said plates extending between said panels in spaced relation thereto and presenting friction webs intermediate said panels, each of said webs sloping toward the adjacent panel and extending transversely thereof, friction shoes slidably seated against said webs and the adjacent panels respectively, and means urging said shoes into frictional engagement with said webs and columns, said member being movable transversely of said panels to afford frictional control of movement of said other plate.

20. In a spring group, spaced plates, coil springs and a friction device therebetween, said friction device comprising spaced friction panels on one of said plates extending toward the other of said plates, a shoe-carrying yoke member on the other plate extending toward said one plate adjacent said panels and spaced therefrom and presenting friction webs each sloping toward the adjacent panel and extending transversely thereof, friction shoes in diagonal face engagement with said webs and in substantially vertical face engagement with the adjacent panels respectively, and means urging said shoes into said engagement, said yoke being movable transversely of said panels under certain conditions to develop friction between said shoes and said webs.

CARL E. TACK.

REFERENCES CITED

The following references are of record in the file of this patent:

UNITED STATES PATENTS

| Number | Name | Date |
| --- | --- | --- |
| 207,020 | Dick et al. | Aug. 13, 1878 |
| 1,301,946 | Johnson | Apr. 29, 1919 |
| 2,011,773 | O'Connor | Aug. 20, 1935 |
| 2,049,709 | Lindeman | Aug. 4, 1936 |
| 2,059,503 | Webb | Nov. 3, 1936 |
| 2,118,006 | Couch | May 17, 1938 |
| 2,276,228 | Cottrell | Mar. 10, 1942 |
| 2,295,556 | Flesch | Sept. 15, 1942 |
| 2,360,262 | Oelkers | Oct. 10, 1944 |
| 2,382,563 | Haseltine | Aug. 14, 1945 |
| 2,398,750 | Light | Apr. 16, 1946 |